(12) United States Patent
Wang et al.

(10) Patent No.: US 12,498,602 B2
(45) Date of Patent: Dec. 16, 2025

(54) DISPLAY MODULE COMPRISING AN OPTICAL FILM HAVING FIRST AND SECOND PATTERN LAYERS EACH INCLUDING A PLURALITY OF PROTRUSIONS AND RECESSES AND DISPLAY DEVICE

(71) Applicant: TCL CHINA STAR OPTOELECTRONICS TECHNOLOGY CO., LTD., Guangdong (CN)

(72) Inventors: Wei Wang, Shenzhen (CN); Weiheng Yang, Shenzhen (CN); Gang Liu, Shenzhen (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 564 days.

(21) Appl. No.: 17/762,100

(22) PCT Filed: Mar. 4, 2022

(86) PCT No.: PCT/CN2022/079309
§ 371 (c)(1),
(2) Date: Mar. 21, 2022

(87) PCT Pub. No.: WO2023/159672
PCT Pub. Date: Aug. 31, 2023

(65) Prior Publication Data
US 2024/0045258 A1    Feb. 8, 2024

(30) Foreign Application Priority Data
Feb. 24, 2022 (CN) .......................... 202210172744.6

(51) Int. Cl.
*G02F 1/1335* (2006.01)
*G02F 1/1337* (2006.01)

(52) U.S. Cl.
CPC .. *G02F 1/133504* (2013.01); *G02F 1/133707* (2013.01)

(58) Field of Classification Search
CPC ................................................ G02F 1/133632
See application file for complete search history.

(56) References Cited

U.S. PATENT DOCUMENTS

2003/0210367 A1   11/2003   Nakano et al.
2014/0353618 A1   12/2014   Shim et al.
(Continued)

FOREIGN PATENT DOCUMENTS

CN     105182613 A     12/2015
CN     109407407 A      3/2019
(Continued)

OTHER PUBLICATIONS

International Search Report in International application No. PCT/CN2022/079309, mailed on Nov. 22, 2022.
(Continued)

*Primary Examiner* — Paul C Lee
(74) *Attorney, Agent, or Firm* — PV IP PC; Christopher S. Ruprecht; Wei Te Chung

(57) ABSTRACT

Embodiments of the present disclosure are directed to a display module and a display device. The display module includes a display panel and an optical film arranged on a light-emitting side of the display panel. The optical film includes a first pattern layer and a second pattern layer disposed on a surface of the first pattern layer away from the display panel. The first pattern layer includes a plurality of first protrusions and a plurality of first recesses away from the display panel. The second pattern layer includes a
(Continued)

plurality of second protrusions and a plurality of second recesses near first pattern layer. A refractive index of the first pattern layer is greater than a refractive index of the second pattern layer.

20 Claims, 4 Drawing Sheets

(56) References Cited

U.S. PATENT DOCUMENTS

| | | | |
|---|---|---|---|
| 2016/0315287 A1 | 10/2016 | Heo | |
| 2021/0055601 A1* | 2/2021 | Kim | G02F 1/133528 |
| 2023/0223501 A1* | 7/2023 | Lüchinger | C09K 11/883 |
| | | | 313/503 |

FOREIGN PATENT DOCUMENTS

| | | | | |
|---|---|---|---|---|
| CN | 109920936 A | 6/2019 | | |
| CN | 110398797 A | 11/2019 | | |
| CN | 111033323 A | 4/2020 | | |
| CN | 111834544 A | 10/2020 | | |
| CN | 112014984 A | * 12/2020 | | G02B 5/0215 |
| CN | 112015010 A | * 12/2020 | | G02F 1/133528 |
| CN | 112394549 A | 2/2021 | | |
| WO | WO-2021234154 A1 | * 11/2021 | | C07F 7/21 |

OTHER PUBLICATIONS

Written Opinion of the International Search Authority in International application No. PCT/CN2022/079309, mailed on Nov. 22, 2022.

Chinese Office Action issued in corresponding Chinese Patent Application No. 202210172744.6 dated Mar. 1, 2025. pp. 1-7.

Chinese Office Action issued in corresponding Chinese Patent Application No. 202210172744.6 dated Jul. 18, 2024, pp. 1-6.

* cited by examiner

DISPLAY MODULE COMPRISING AN OPTICAL FILM HAVING FIRST AND SECOND PATTERN LAYERS EACH INCLUDING A PLURALITY OF PROTRUSIONS AND RECESSES AND DISPLAY DEVICE

FIELD OF THE DISCLOSURE

The present disclosure relates to display technology, and more particularly, to a display module and a display device.

BACKGROUND

A consumer pays more and more attention to the display effect of a display module. An angle formed by the display light is narrower so the consumer mainly concentrates on a front direction. As a viewing angle increases while the viewing effect of the display module upon a side viewing angle gets worse, the display effect of the display module decreases in the end.

Therefore, it is necessary to adopt a new display module and a new display device with the display module to tackle this problem.

SUMMARY

Technical Problem

An object of the present disclosure is to propose a display module and a display device to try to deal with the technical issue that a viewing angle has a poor viewing effect for the display module and the display device in the related art.

Technical Solution

In order to solve to the above technical problem, embodiments of the present disclosure are directed to a display module and a display panel as follows.

According to a first aspect of the present disclosure, a display module includes a display panel and an optical film arranged on a light-emitting side of the display panel.

The optical film includes a first pattern layer and a second pattern layer disposed on a surface of the first pattern layer away from the display panel. The first pattern layer includes a plurality of first protrusions and a plurality of first recesses away from the display panel.

The second pattern layer includes a plurality of second protrusions and a plurality of second recesses near first pattern layer.

A refractive index of the first pattern layer is greater than a refractive index of the second pattern layer. One of the plurality of first protrusions corresponds to one of the plurality of second recesses. One of the plurality of first recesses corresponds to one of the plurality of second protrusions.

Optionally, the optical film further comprises a plurality of scatter particles disposed in any one film layer of the optical film.

Optionally, one or more of the plurality of scatter particles are solid particles. A refractive index of the scatter particle is different from a refractive index of the corresponding film layer where the scatter particle is disposed.

Optionally, one or more of the scatter particles comprise a particulate body and a cavity arranged inside the particulate body. A refractive index of a medium in the cavity is different from a refractive index of the particulate body.

Optionally, the cavity is filled with a first gas inside. A refractive index of the first gas is different from the refractive index of the particulate body.

Optionally, the density of a scatter particle, which comprises the first gas, gradually increases in a light-emitting direction of the display module.

Optionally, the cavity is filled with a first liquid, and a refractive index of the first liquid is different from the refractive index of the particulate body.

Optionally, the density of the scatter particle, which comprises the first liquid, gradually decreases in the light-emitting direction of the display module.

Optionally, one or more of the scatter particles comprise the particulate body and one or more holes. The hole penetrates the particulate body. The hole is filled with the corresponding film layer. A refractive index of the particulate body is different from a refractive index of the corresponding film layer where the particulate body is disposed.

Optionally, a refractive index of a film layer closest to the display panel in the optical film is greater than a refractive index of a film layer furthest away from the display panel in the optical film. The difference between the refractive index of the film layer closest to the display panel. The refractive index of the film layer furthest away from the display panel in the optical film is greater than or equal to 0.2.

Optionally, the optical film further comprises one or more transparent layers disposed on one side of the second pattern layer away from the first pattern layer. Refractive indices of the two adjacent film layers gradually decrease in the light-emitting direction of the display module in the optical film.

Optionally, the optical film further comprises a third transparent layer and a fourth transparent layer. The third transparent layer is arranged at one side of a second pattern layer away from the first pattern layer. The fourth transparent layer is arranged at one side of the third transparent layer away from the first pattern layer. The second pattern layer further comprises a plurality of third protrusions and a plurality of third recesses. The plurality of third protrusions and the plurality of third recesses are arranged near the third transparent layer. The third transparent layer comprises a plurality of fourth protrusions, a plurality of fourth recesses, a plurality of fifth protrusions, and a plurality of fifth recesses. The plurality of fourth protrusions and the plurality of fourth recesses are arranged near the second pattern layer. The plurality of fifth protrusions and the plurality of fifth recesses are arranged near the fourth transparent layer. The fourth transparent layer comprises a plurality of sixth protrusions and a plurality of sixth recesses. The plurality of sixth protrusions and the plurality of sixth recesses are arranged near the third transparent layer. The refractive index of the second pattern layer is greater than a refractive index of the third transparent layer. The refractive index of the third transparent layer is greater than a refractive index of the fourth transparent layer. One of the plurality of third protrusions corresponds to one of the plurality of fourth recesses. One of the plurality of third recesses corresponds to one of the plurality of fourth protrusions. One of the plurality of fifth protrusions corresponds to one of the plurality of sixth recesses. One of the plurality of fifth recesses corresponds to one of the plurality of sixth protrusions.

According to a second aspect of the present disclosure, a display device includes a device body and a display module assembled to the device body.

The display module includes a display panel and an optical film arranged on a light-emitting side of the display panel. The optical film includes a first pattern layer and a second pattern layer disposed on a surface of the first pattern layer away from the display panel.

The first pattern layer includes a plurality of first protrusions and a plurality of first recesses away from the display panel.

The second pattern layer includes a plurality of second protrusions and a plurality of second recesses near first pattern layer.

A refractive index of the first pattern layer is greater than a refractive index of the second pattern layer. One of the plurality of first protrusions corresponds to one of the plurality of second recesses. One of the plurality of first recesses corresponds to one of the plurality of second protrusions.

Optionally, the optical film further comprises a plurality of scatter particles disposed in any one film layer of the optical film.

Optionally, one or more of the plurality of scatter particles are solid particles. A refractive index of the scatter particle is different from a refractive index of the corresponding film layer where the scatter particle is disposed.

Optionally, one or more of the scatter particles comprise a particulate body and a cavity arranged inside the particulate body. A refractive index of a medium in the cavity is different from a refractive index of the particulate body.

Optionally, the cavity is filled with a first gas inside. A refractive index of the first gas is different from the refractive index of the particulate body.

Optionally, the density of a scatter particle, which comprises the first gas, gradually increases in a light-emitting direction of the display module.

Optionally, the cavity is filled with a first liquid, and a refractive index of the first liquid is different from the refractive index of the particulate body.

Optionally, the density of the scatter particle, which comprises the first liquid, gradually decreases in the light-emitting direction of the display module.

Advantageous Effect

A transparent layer with high and low refractive indices is arranged at a light-emitting side of a display panel in a preferred embodiment of the present disclosure. The display light is emitted from a film layer with a high refractive index to a film layer with a low refractive index with the cooperation of protrusions and recesses to enlarge the complexity of the optical structure, increase the scattering of the light, improve the side viewing angle of the display light, and enhance the display effect of the display module.

DETAILED DESCRIPTION OF THE EMBODIMENTS

Figure 1:
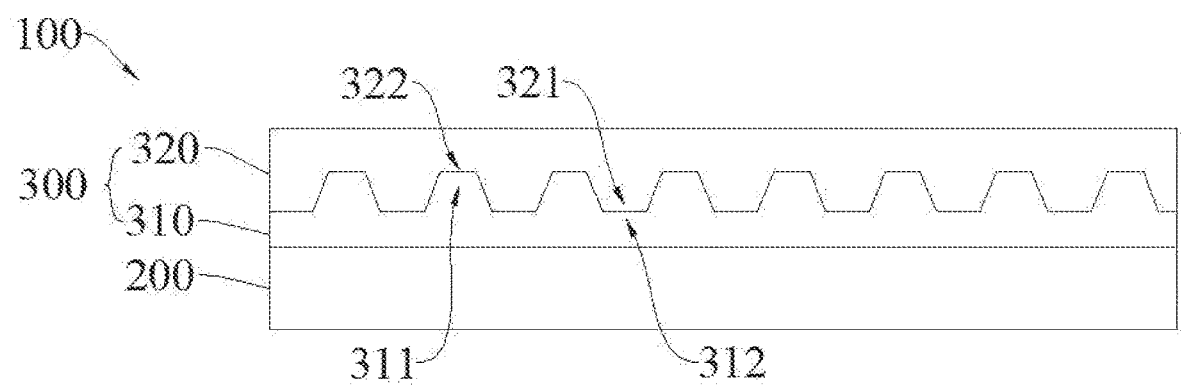
FIG. 1 is a schematic diagram of a display module according to an embodiment of the present disclosure.

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Embodiments of the present disclosure are directed to a display module and a display device, which are described in detail below. It should be noted that the description order of the following embodiments is not intended to limit the preferred order of the embodiments.

Referring to FIGS. 1-7, a display module 100 includes a display panel 200 and an optical film 300 arranged on a light-emitting side of the display panel 200.

The display panel 200 includes a first pattern layer 310 and a second pattern layer 320. The first pattern layer 310 includes a plurality of first protrusions 311 and a plurality of first recesses 312 away from the display panel 200.

The second pattern layer 320 is disposed on a surface of the first pattern layer 310 away from the display panel 200. The second pattern layer 320 includes a plurality of second protrusions 321 and a plurality of second recesses 322 near first pattern layer 310.

The refractive index of the first pattern layer 310 is greater than the refractive index of the second pattern layer 320. One of the plurality of first protrusions 311 corresponds to one of the plurality of second recesses 322. One of the plurality of first recesses 312 corresponds to one of the plurality of second protrusions 321.

A transparent layer with high and low refractive indices is arranged at a light-emitting side of the display panel in a preferred embodiment of the present disclosure. The display light is emitted from a film layer with a high refractive index to a film layer with a low refractive index with the cooperation of protrusions and recesses. Therefore, the complexity of the optical structure enlarges, the scattering of the light increases, the side viewing angle of the display light improves, and the display effect of the display module enhances.

The technical solutions of the present disclosure is described with reference to specific embodiments.

FIG. 1 is a schematic diagram of a display device 100 according to a preferred embodiment of the present disclosure. The display device 100 includes a display panel 200 and an optical film 300 arranged at a light-emitting side of the display panel 200.

The optical film 300 includes one or more first pattern layers 310 and second pattern layers 320. The second pattern layer 320 is arranged on a surface of the first pattern layer 310 away from the display panel 200. The first pattern layer 310 includes a plurality of first protrusions 311 and a plurality of first recesses 312. The plurality of first protrusions 311 and the plurality of first recesses 312 are arranged away from the display panel 200. The second pattern layer 320 includes a plurality of second protrusions 321 and a plurality of second recesses 322. The plurality of second protrusions 321 and the plurality of second recesses 322 are arranged near the first pattern layer 310. The refractive index of the first pattern layer 310 is greater than the refractive index of the second pattern layer 320. One of the plurality of first protrusions 311 corresponds to one of the plurality of second recesses 322. One of the plurality of first recesses 312 corresponds to one of the plurality of second protrusions 321.

The first pattern layer 310 is nearer to the display, and the second pattern layer 320 is nearer to the human eye. The display light emitted by the display panel 200 penetrates the first pattern layer 310 and the second pattern layer 320. Because the refractive index of the second pattern layer 320 is less than the refractive index of the first pattern layer 310, more display light will be emitted in the direction of the side viewing angle. In line with the first protrusion 311 and the second recessed 322 and with the cooperation of the first recess 312 and the second protrusion 321, the light on the interface between the first protrusion 311 and the second recess 322 and on the interface between the first recess 312 and the second protrusion 321 diffuses and the complexity of the optical structure enlarges. Combined with the difference in refractive indices to increase the scattering of the light, the side viewing angle of the display light improves and the display effect of the display module enhances.

Figure 2:
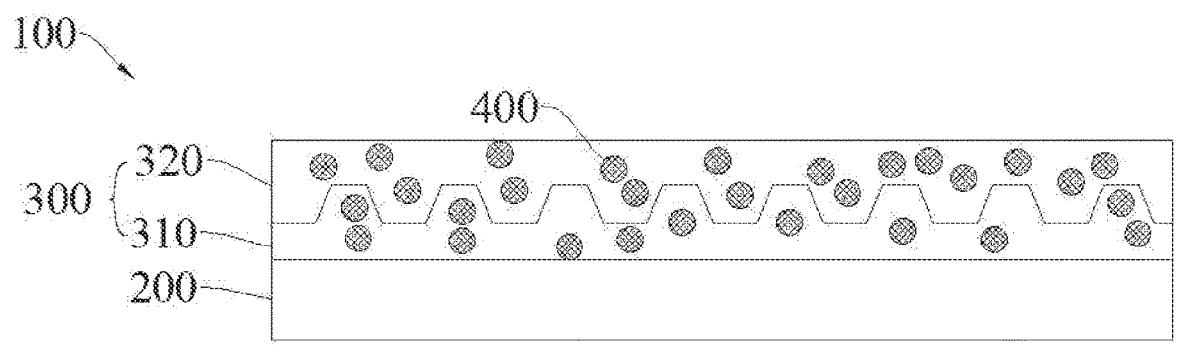
FIG. 2 is a schematic diagram of a display module according to another embodiment of the present disclosure.

As FIG. 2 illustrates, the optical film 300 further includes a plurality of scatter particles 400 disposed in any one of the film layers of the optical film 300.

Because any one of the film layers in the optical film 300 is filled with the plurality of the scatter particles 400, the complexity of the optical structure of the optical film 300 further improves. Therefore, the scattering of the light enlarges, the viewing effect upon a side viewing angle of the display light increases, and the display effect of the display module 100 enhances.

Figure 3:
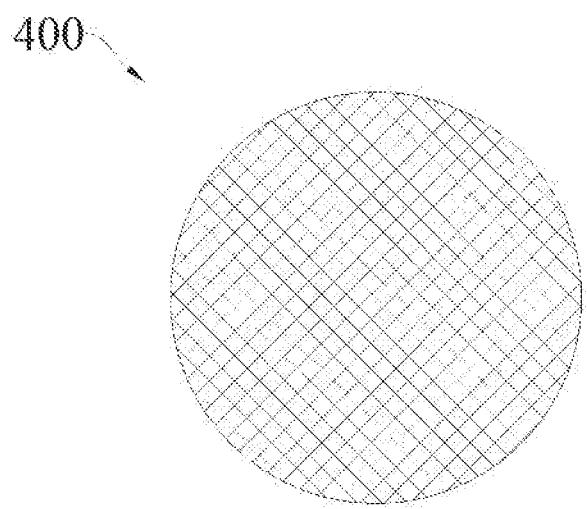
FIG. 3 illustrates a scatter particle according to a first embodiment of the present disclosure.

As FIG. 3 illustrates, one or more of the plurality of scatter particles 400 are solid. The refractive index of the scatter particle 400 is different from the refractive index of its corresponding film layer where the scatter particle 400 is disposed.

The scatter particle 400 is a solid particle so the refractive index of the scatter particle 400 is different from the refractive index of its corresponding film layer where the scatter particle 400 is disposed and the complexity of the optical structure of the optical film 300 improves. Owing to the difference in the refractive index, the scattering effect of the display light upon the scatter particle 400 is increased. Because the environmental reflective light diffuses in all directions, the effect of the external environmental light is lowered. Therefore, the scattering of the light enhances, the viewing effect upon a side viewing angle of the display light improves, and the display effect of display module 100 increases.

Figure 4:
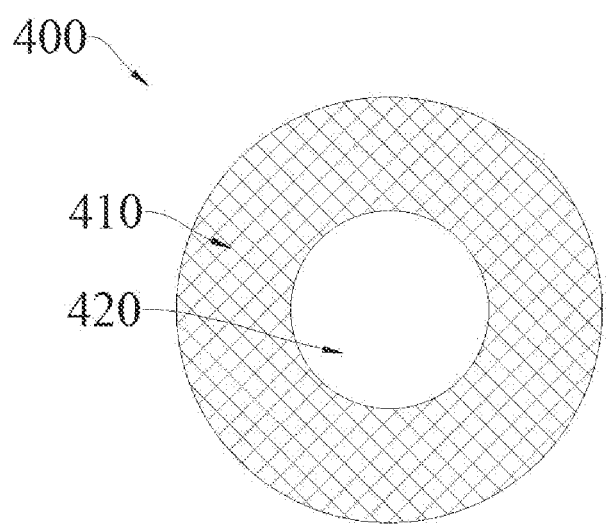
FIG. 4 illustrates a scatter particle according to a second embodiment of the present disclosure.

As FIG. 4 illustrates, one or more of the plurality of scatter particles 400 include a particulate body 410 and a cavity 420. The cavity 420 is arranged inside the particulate body 410. The refractive index of a medium in the cavity 420 is different from the refractive index of the particulate body 410.

The particulate body 410 wraps the cavity 420. The particulate body 410 is a hollow structure when there is no filler inside the particulate body 410. The particulate body 410 is filled with mediums with different refractive indices inside so the complexity of the optical structure of the optical film 300 improves. Owing to the difference in the refractive index, the scattering effect of the display light upon the scatter particle 400 is increased. By means of the diffusion of the environmental reflective light in all directions, the environmental light and the lamp shadow become empty, and the effect of the external environmental light is lowered. Therefore, the scattering of the light enhances, the viewing effect upon a side viewing angle of the display light improves, and the display effect of display module 100 increases.

The cavity 420 is filled with a first gas inside. The refractive index of the first gas is different from the refractive index of the particulate body 410.

The particulate body 410 wraps the cavity 420. The particulate body 410 is a hollow structure when there is no filler inside. The cavity 420 is filled with a first gas inside. The refractive index of the first gas is different from the refractive index of the particulate body 410 so the complexity of the optical structure of the optical film 300 improves. Owing to the difference in the refractive index, the scattering effect of the display light upon the scatter particle 400 is increased. By means of the diffusion of the environmental reflective light in all directions, the environmental light and the lamp shadow become empty, and the effect of the external environmental light is lowered. Therefore, the scattering of the light enhances, the viewing effect upon a side viewing angle of the display light improves, and the display effect of display module 100 increases.

In other preferred embodiments of the present disclosure, the density of a scatter particle 400, which includes a first gas, gradually increases in a light-emitting direction of a display module 100.

At one side of a display module 100 near the user's eyes, the density of the scatter particle 400, which includes the first gas, gradually increases so the difference between the refractive index of the scatter particle 400 and the refractive index of the outside air can be reduced, which can allow the display light to emit more smoothly to the human eye and can reduce the loss of the display light refraction. The complexity of the optical structure of the optical film 300 improves. By means of the difference in the refractive index, the scattering effect of the display light upon the scatter particle 400 is increased. By means of the diffusion of the environmental reflective light in all directions, the environmental light and the lamp shadow become empty, and the effect of the external environmental light is lowered. Therefore, the scattering of the light enhances, the viewing effect upon a side viewing angle of the display light improves, and the display effect of display module 100 increases.

The first gas may be an inert gas such as helium, nitrogen. The present embodiment only gives an example and does not mean to limit the present disclosure itself. Nitrogen is the maximum component in the air, and the refractive indices of the gas are similar. Under the same conditions, the refractive index of the first gas is similar to the refractive index of the air outside the display module 100 so the refractive index of the first gas may be negligible.

The cavity 420 is filled with a first liquid inside. The refractive index of the first liquid is different from the refractive index of the particulate body 410.

The particulate body 410 wraps the cavity 420. The first liquid is filled in the cavity 420. The refractive index of the first liquid or the refractive index of the first gas is different from the refractive index of the particulate body 410. By increasing the complexity of the optical structure of the optical film 300, using the difference in the refractive index, and increasing the scattering effect of the display light upon the scatter particle 400, the environmental reflective light diffuses in all directions, the environmental light and the lamp shadow become empty, and the effect of the external environmental light is lowered. Therefore, the scattering of the light enhances, the viewing effect upon a side viewing angle of the display light improves, and the display effect of display module 100 increases.

The density of the scatter particle 400, which includes the first liquid, gradually decreases in the light-emitting direction of the display module 100.

The density of the scatter particle 400, which includes the first liquid, gradually decreases in the light-emitting direction of the display module 100. The refractive index of the scatter particle 400, which includes the first liquid, and the refractive index of the scatter particles 400, which includes the gas, are enlarged. By increasing the complexity of the optical structure of the optical film 300, using the difference in the refractive index, and increasing the scattering effect of the display light upon the scatter particle 400, the environmental reflective light diffuses in all directions, the environmental light and the lamp shadow become empty, and the effect of the external environmental light is lowered. Therefore, the scattering of the light enhances, the viewing effect upon a side viewing angle of the display light improves, and the display effect of display module 100 increases.

Figure 5:
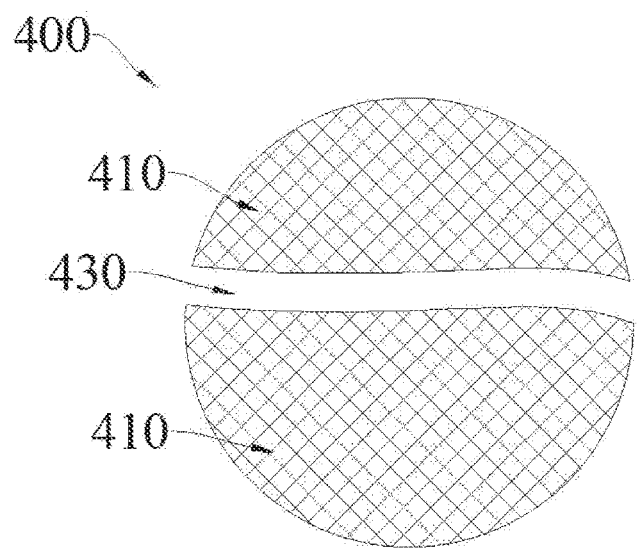
FIG. 5 illustrates a scatter particle according to a third embodiment of the present disclosure.

Please refer to FIG. 5. One or more of the scatter particles 400 include the particulate body 410 and one or more holes 430. The hole 430 penetrates the particulate body 410. The hole 430 is filled with its corresponding film layer inside. The refractive index of the particulate body 410 is different from the refractive index of its corresponding film layer where the particulate body 400 is disposed.

It is only necessary to penetrate the particulate body 410 with the hole 430, forming with the optical film 300. The manufacturing process is simple. Because the refractive index of the hole 430 and the refractive index of the particulate body 410 are different from the refractive index of their corresponding film layer where the hole 430 and the particulate body 410 are disposed, the complexity of the optical structure of the optical film 300 improves. Owing to the difference in the refractive index, the scattering effect of the display light upon the scatter particle 400 is increased. Since the environmental reflective light diffuses in all directions, the environmental light and the lamp shadow become empty, and the effect of the external environmental light is lowered. Therefore, the scattering of the light enhances, the viewing effect upon a side viewing angle of the display light improves, and the display effect of display module 100 increases.

The refractive index of a film layer closest to the display panel 200 in the optical film 300 is greater than the refractive index of a film layer furthest away from the display panel 200 in the optical film 300. The difference between the refractive index of the film layer closest to the display panel 200 and the refractive index of the film layer furthest away from the display panel 200 in the optical film 300 is greater than or equal to 0.2.

If the refractive index of a film layer closest to the display panel 200 in the optical film 300 is greater than the refractive index of a film layer furthest away from the display panel 200 in the optical film 300, the display light has a scattering effect. If the difference between the refractive index of a film layer closest to the display panel 200 and the refractive index of a film layer furthest away from the display panel 200 in the optical film 300 is greater than or equal to 0.2, the side viewing angle has a display effect. If the structure of the multiple film layers is used, the difference between the refractive indices of two adjacent film layers in the optical film 300 is less than 0.2. The less the difference between the interlayer refractive indices is, the less the refractive index of the display light becomes. The less the light loss is, the more the light transmittance increases.

For example, the optical film 300 only includes the first pattern layer 310 and the second pattern layer 320. The difference between the refractive index of the first pattern layer 310 and the refractive index of the second pattern layer 320 is greater than or equal to 0.2. For example, the optical film 300 includes the first pattern layer 310, the second pattern layer 320, and the third transparent layer 330. The third transparent layer 330 is arranged at one side of the second pattern layer 320 away from the first pattern layer 310. The difference between the refractive index of the first pattern layer 310 and the refractive index of the third transparent layer 330 may be greater than 0.3. The difference between the refractive index of the first pattern layer 310 and the refractive index of the second pattern layer 320 may be greater than 0.15. The difference between the refractive index of the second pattern layer 320 and the refractive index of the third transparent layer 330 may be greater than 0.15. Therefore, the loss of the display light is reduced while the display effect of the side viewing angle is ensured. The present embodiment only gives an example and does not mean to limit the present disclosure.

Figure 6:
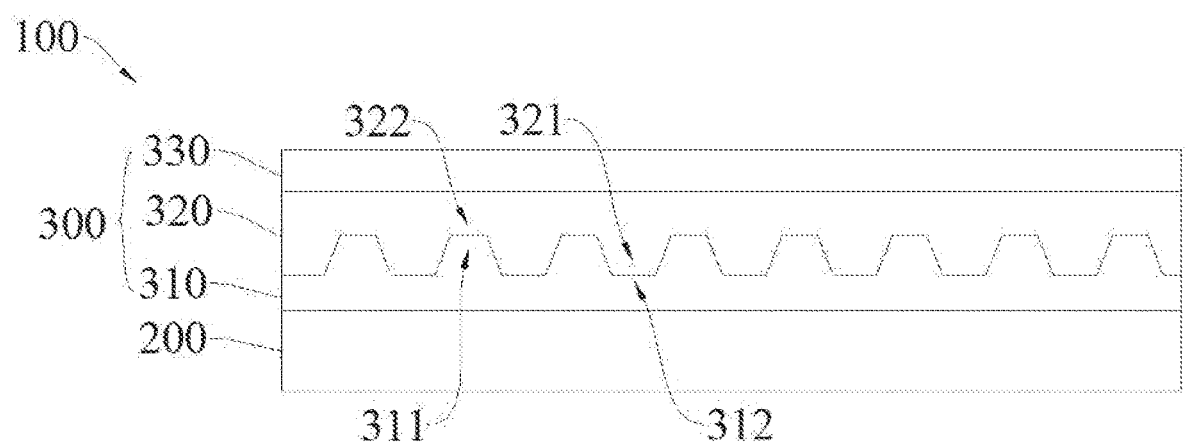
FIG. 6 is a schematic diagram of a display module according to still another embodiment of the present disclosure.

Please refer to FIG. 6, the optical film 300 further includes one or more transparent layers disposed on one side of the second pattern layer 320 away from the first pattern layer 310. So the refractive indices of the two adjacent film layers gradually decrease in the light-emitting direction of the display module 100 in the optical film 300.

Take the third transparent layer 330 for example. As FIG. 6 illustrates, one or more transparent layers is disposed on one side of the second pattern layer 320 away from the first pattern layer 310. Owing to the difference in the refractive index of multiple film layers, the scattering effect of the display light upon the scatter particle 400 increases, the environmental reflective light diffuses in all directions. Therefore, the environmental light and the lamp shadow can become empty, the effect of the external environmental light is lowered, the scattering of the light enhances, the viewing effect upon a side viewing angle of the display light improves, and the display effect of display module 100 increases.

Figure 7:
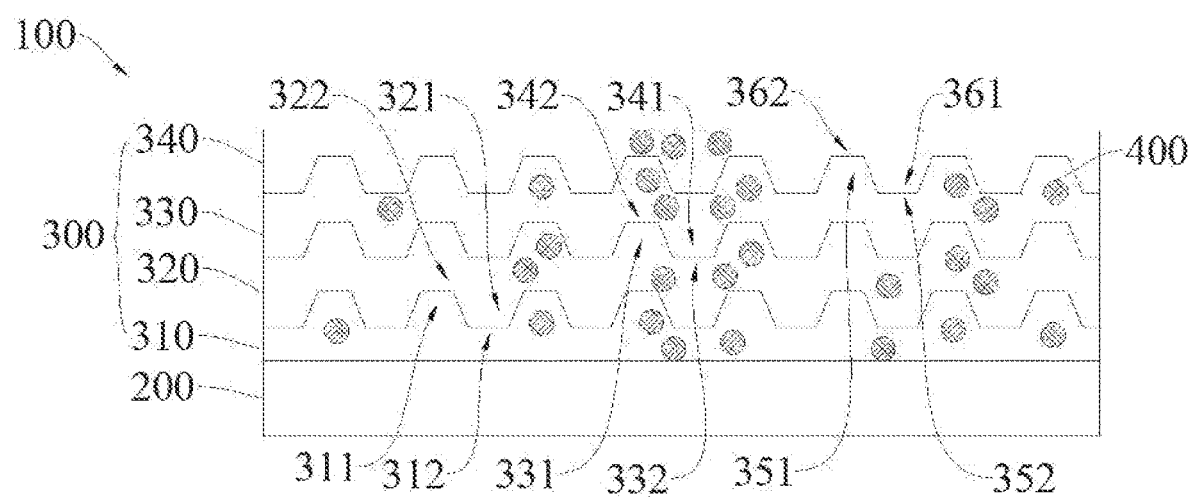
FIG. 7 is a schematic diagram of a display module according to yet another embodiment of the present disclosure.

In other preferred embodiments of the present disclosure, as FIG. 7 illustrates, an optical film 300 further includes a third transparent layer 330 and a fourth transparent layer 340. The third transparent layer 330 is arranged at one side of a second pattern layer 320 away from a first pattern layer 310. The fourth transparent layer 340 is arranged at one side of the third transparent layer 330 away from the first pattern layer 310. The second pattern layer 320 further includes a plurality of third protrusions 331 and a plurality of third recesses 332. The plurality of third protrusions 331 and the plurality of third recesses 332 are arranged near the third transparent layer 330. The third transparent layer 330 includes a plurality of fourth protrusions 341, a plurality of fourth recesses 342, a plurality of fifth protrusions 351, and a plurality of fifth recesses 352. The plurality of fourth protrusions 341 and the plurality of fourth recesses 342 are arranged near the second pattern layer 320. The plurality of fifth protrusions 351 and the plurality of fifth recesses 352 are arranged near the fourth transparent layer 340. The fourth transparent layer 340 includes a plurality of sixth protrusions 361 and a plurality of sixth recesses 362. The plurality of sixth protrusions 361 and the plurality of sixth recesses 362 are arranged near the third transparent layer 330. Especially, the refractive index of the second pattern layer 320 is greater than the refractive index of the third transparent layer 330, and the refractive index of the third transparent layer 330 is greater than the refractive index of the fourth transparent layer 340. One of the plurality of third protrusions 331 corresponds to one of the plurality of fourth recesses 342. One of the plurality of third recesses 332 corresponds to one of the plurality of fourth protrusions 341. One of the plurality of fifth protrusions 351 corresponds to one of the plurality of sixth recesses 362. One of the plurality of fifth recesses 352 corresponds to one of the plurality of sixth protrusions 361.

Owing to multiple film layers with multiple protrusions and multiple recesses, three groups of protrusions and recesses form an interface to lose the display light transmittance less and further, the complexity of the optical structure of the optical film 300 improves. Owing to the difference in the refractive index, the scattering effect of the display light upon the scatter particle 400 is increased. Because the environmental reflective light diffuses in all directions, the environmental light and the lamp shadow become empty, and the effect of the external environmental light is lowered. Therefore, the scattering of the light enhances, the viewing effect upon a side viewing angle of the display light improves, and the display effect of display module 100 increases.

Please refer to FIG. 7. In a direction from the edge of the display module 100 to the center of the display module 100, the density of the first recesses 312 and the first protrusions 311 increases, and the density of the second recesses 322 and the second protrusions 321 increases. In this way, the side viewing angle of the center of the display module 100 improves, and the side viewing effect of the display panel 200 enhances.

In the light-emitting direction of the display module 100, the refractive index of the first liquid in the cavity 420 gradually decreases.

At one side of a display module 100 near to the user's eyes, the refractive index of the first liquid in the cavity 420 gradually decreases so the difference between the refractive index of the cavity 420 and the refractive index of the outer air can be reduced, which can allow the display light to emit more smoothly to the human eye and can reduce the loss of the display light refraction.

The particulate body 410 may be made from inorganic materials such as silicon dioxide, titanium dioxide, etc. The present embodiment only gives an example and does not mean to limit the present disclosure.

The optical film 300 may be made from a transparent material such as an acrylic polymer, a urethane polymer, etc. The present embodiment only gives an example and does not mean to limit the present disclosure. The refractive index of the corresponding film layer is changed by controlling the ratio of the materials for the optical film 300.

The display panel 200 includes an array substrate. The array substrate includes an active layer, a first insulating layer, a gate layer, a second insulating layer, a source/drain layer, and a third insulating layer. The active layer is arranged on the substrate. The first insulating layer is arranged on the active layer. The gate layer is arranged on the first insulating layer. The second insulating layer is arranged on the gate layer. The source/drain layer is arranged on the second insulating layer. The third insulating layer is arranged on the source/drain layer.

The display panel 200 may further include a light-emitting device layer. The display panel 200 is a self-emitting display panel 200.

The light-emitting device layer includes an anode layer, a light-emitting material layer, and a cathode layer. The anode layer is disposed on the third insulating layer. The light-emitting material layer is disposed on the anode layer. The cathode layer is disposed on the light-emitting material layer. The display panel further includes a pixel definition layer, a polarizing layer, and a flexible cover. The pixel definition layer and the light-emitting material layer are disposed on the same layer. The polarizing layer is disposed on the light-emitting device layer. The flexible cover is disposed on the polarizing layer. The display panel 200 may further include a corresponding adhesive layer. The corresponding adhesive layer is disposed between the polarizing layer and the flexible cover, between the light-emitting device layer and the polarizing layer, and between the backplate and the substrate.

The light-emitting device layer may be made from an organic light-emitting diode (OLED). Otherwise, the light-emitting device layer may be made from a micro light-emitting diode (LED) or mini LED. No specific definitions are provided in the present embodiment.

The display panel 200 is a liquid crystal display (LCD) panel 200. The display panel 200 includes a liquid crystal layer and a color film layer. The display module 100 further includes a backlight unit.

A transparent layer with high and low refractive indices is arranged at the light-emitting side of the display panel in the embodiment of the present disclosure. The display light is emitted from a film layer with a high refractive index to a film layer with a low refractive index with cooperation of protrusions and recesses to enlarge the complexity of the optical structure, increase the scattering of the light, improve the side viewing angle of the display light, and enhance the display effect of the display module.

Figure 8:
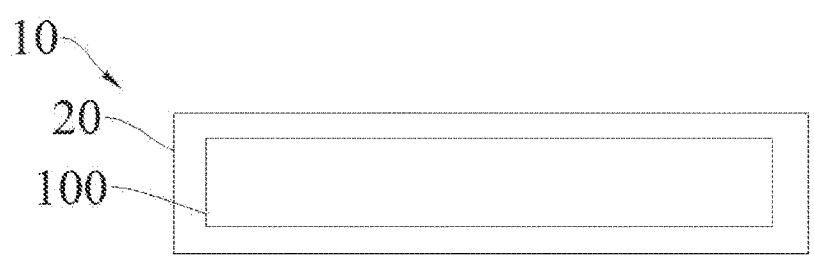
FIG. 8 is a schematic diagram of a display device according to an embodiment of the present disclosure.

Please refer to FIG. 8. The present embodiment further proposes a display device 10. The display device 10 includes a display module 100 and a device body 20. The device body 20 and the display module 100 are combined into an integral.

The specific structure of the display module 100 may be referred to the preferred embodiments of the present disclosure which details the display module 100 with the figures for the display module 100. The details in the specific structure of the display module 100 will be skipped.

The device body 20 may include a middle frame, a frame adhesive, etc. The display device 10 may be a mobile display terminal such as a mobile phone, a flat panel, and so on.

Embodiments of the present disclosure are directed to a display module and a display device. The display module includes a display panel and an optical film arranged on a light-emitting side of the display panel. The optical film includes a first pattern layer and a second pattern layer disposed on a surface of the first pattern layer away from the display panel. The first pattern layer includes a plurality of first protrusions and a plurality of first recesses away from the display panel. The second pattern layer includes a plurality of second protrusions and a plurality of second recesses near first pattern layer. A refractive index of the first pattern layer is greater than a refractive index of the second pattern layer. One of the plurality of first protrusions corresponds to one of the plurality of second recesses. One of the plurality of first recesses corresponds to one of the plurality of second protrusions. A transparent layer with high and low refractive indices is arranged at a light-emitting side of a display panel in a preferred embodiment of the present disclosure. The display light is emitted from a film layer with a high refractive index to a film layer with a low refractive index with the cooperation of protrusions and recesses to enlarge the complexity of the optical structure, increase the scattering of the light, improve the side viewing angle of the display light, and enhance the display effect of the display module.

The present disclosure has been described with a preferred embodiment thereof and it is understood that many changes and modifications to the described embodiment can be carried out without departing from the scope and the spirit of the invention that is intended to be limited only by the appended claims.

What is claimed is:

1. A display module, comprising:
a display panel; and
an optical film arranged on a light-emitting side of the display panel, comprising:
a first pattern layer, comprising a plurality of first protrusions and a plurality of first recesses away from the display panel; and
a second pattern layer, disposed on a surface of the first pattern layer away from the display panel and comprising a plurality of second protrusions and a plurality of second recesses near first pattern layer;
wherein a refractive index of the first pattern layer is greater than a refractive index of the second pattern layer; one of the plurality of first protrusions corresponds to one of the plurality of second recesses; one of the plurality of first recesses corresponds to one of the plurality of second protrusions;
wherein the optical film further comprises a plurality of scatter particles disposed in any one film layer of the optical film;
wherein the optical film further comprises a third transparent layer and a fourth transparent layer; the third transparent layer is arranged at one side of a second pattern layer away from the first pattern layer; the fourth transparent layer is arranged at one side of the third transparent layer away from the first pattern layer;
the second pattern layer further comprises a plurality of third protrusions and a plurality of third recesses; the plurality of third protrusions and the plurality of third recesses are arranged near the third transparent layer;
the third transparent layer comprises a plurality of fourth protrusions, a plurality of fourth recesses, a plurality of fifth protrusions, and a plurality of fifth recesses; the plurality of fourth protrusions and the plurality of fourth recesses are arranged near the second pattern layer; the plurality of fifth protrusions and the plurality of fifth recesses are arranged near the fourth transparent layer;
the fourth transparent layer comprises a plurality of sixth protrusions and a plurality of sixth recesses; the plurality of sixth protrusions and the plurality of sixth recesses are arranged near the third transparent layer;
the refractive index of the second pattern layer is greater than a refractive index of the third transparent layer; the refractive index of the third transparent layer is greater than a refractive index of the fourth transparent layer; one of the plurality of third protrusions corresponds to one of the plurality of fourth recesses; one of the plurality of third recesses corresponds to one of the plurality of fourth protrusions; one of the plurality of fifth protrusions corresponds to one of the plurality of sixth recesses; one of the plurality of fifth recesses corresponds to one of the plurality of sixth protrusions.

2. The display module according to claim 1, wherein one or more of the scatter particles comprise a particulate body and a cavity arranged inside the particulate body; a refractive index of a medium in the cavity is different from a refractive index of the particulate body.

3. The display module according to claim 2, wherein the cavity is filled with a first gas inside; a refractive index of the first gas is different from the refractive index of the particulate body.

4. The display module according to claim 3, wherein the density of a scatter particle, which comprises the first gas, gradually increases in a light-emitting direction of the display module.

5. The display module according to claim 2, wherein the cavity is filled with a first liquid, and a refractive index of the first liquid is different from the refractive index of the particulate body.

6. The display module according to claim 5, wherein the density of the scatter particle, which comprises the first liquid, gradually decreases in the light-emitting direction of the display module.

7. The display module according to claim 1, wherein one or more of the scatter particles comprise the particulate body and one or more holes; the hole penetrates the particulate body; the hole is filled with the corresponding film layer; a refractive index of the particulate body is different from a refractive index of the corresponding film layer where the particulate body is disposed.

8. The display module according to claim 1, wherein a refractive index of a film layer closest to the display panel in the optical film is greater than a refractive index of a film layer furthest away from the display panel in the optical film;
the difference between the refractive index of the film layer closest to the display panel and the refractive index of the film layer furthest away from the display panel in the optical film is greater than or equal to 0.2.

9. The display module according to claim 1, wherein the optical film further comprises one or more transparent layers disposed on one side of the second pattern layer away from the first pattern layer;
refractive indices of the two adjacent film layers gradually decrease in the light-emitting direction of the display module in the optical film.

10. A display device, comprising:
a device body; and
a display module assembled to the device body, comprising:
a display panel; and
an optical film arranged on an eminent side of the display panel, comprising:
a first pattern layer, comprising a plurality of first protrusions and a plurality of first recesses away from the display panel; and
a second pattern layer, disposed on a surface of the first pattern layer away from the display panel and comprising a plurality of second protrusions and a plurality of second recesses near first pattern layer;
wherein a refractive index of the first pattern layer is greater than a refractive index of the second pattern layer; one of the plurality of first protrusions corresponds to one of the plurality of second recesses; one of the plurality of first recesses corresponds to one of the plurality of second protrusions;
wherein the optical film further comprises a plurality of scatter particles disposed in any one film layer of the optical film;
wherein the optical film further comprises a third transparent layer and a fourth transparent layer; the third transparent layer is arranged at one side of a second pattern layer away from the first pattern layer; the fourth transparent layer is arranged at one side of the third transparent layer away from the first pattern layer;

the second pattern layer further comprises a plurality of third protrusions and a plurality of third recesses; the plurality of third protrusions and the plurality of third recesses are arranged near the third transparent layer;

the third transparent layer comprises a plurality of fourth protrusions, a plurality of fourth recesses, a plurality of fifth protrusions, and a plurality of fifth recesses; the plurality of fourth protrusions and the plurality of fourth recesses are arranged near the second pattern layer; the plurality of fifth protrusions and the plurality of fifth recesses are arranged near the fourth transparent layer;

the fourth transparent layer comprises a plurality of sixth protrusions and a plurality of sixth recesses; the plurality of sixth protrusions and the plurality of sixth recesses are arranged near the third transparent layer;

the refractive index of the second pattern layer is greater than a refractive index of the third transparent layer; the refractive index of the third transparent layer is greater than a refractive index of the fourth transparent layer; one of the plurality of third protrusions corresponds to one of the plurality of fourth recesses; one of the plurality of third recesses corresponds to one of the plurality of fourth protrusions; one of the plurality of fifth protrusions corresponds to one of the plurality of sixth recesses; one of the plurality of fifth recesses corresponds to one of the plurality of sixth protrusions.

11. The display device according to claim 10, wherein one or more of the scatter particles comprise a particulate body and a cavity arranged inside the particulate body; a refractive index of a medium in the cavity is different from a refractive index of the particulate body.

12. The display device according to claim 11, wherein the cavity is filled with a first gas inside; a refractive index of the first gas is different from the refractive index of the particulate body.

13. The display device according to claim 12, wherein the density of a scatter particle, which comprises the first gas, gradually increases in a light-emitting direction of the display module.

14. The display device according to claim 11, wherein the cavity is filled with a first liquid, and a refractive index of the first liquid is different from the refractive index of the particulate body.

15. The display device according to claim 14, wherein the density of the scatter particle, which comprises the first liquid, gradually decreases in the light-emitting direction of the display module.

16. A display module, comprising:
a display panel; and
an optical film arranged on a light-emitting side of the display panel, comprising:
a first pattern layer, comprising a plurality of first protrusions and a plurality of first recesses away from the display panel; and
a second pattern layer, disposed on a surface of the first pattern layer away from the display panel and comprising a plurality of second protrusions and a plurality of second recesses near first pattern layer;
wherein a refractive index of the first pattern layer is greater than a refractive index of the second pattern layer; one of the plurality of first protrusions corresponds to one of the plurality of second recesses; one of the plurality of first recesses corresponds to one of the plurality of second protrusions;

wherein the optical film further comprises a plurality of scatter particles disposed in any one film layer of the optical film; one or more of the scatter particles comprise the particulate body and one or more holes; the hole penetrates the particulate body; the hole is filled with the corresponding film layer; a refractive index of the particulate body is different from a refractive index of the corresponding film layer where the particulate body is disposed.

17. The display module according to claim 16, wherein a refractive index of a film layer closest to the display panel in the optical film is greater than a refractive index of a film layer furthest away from the display panel in the optical film; the difference between the refractive index of the film layer closest to the display panel and the refractive index of the film layer furthest away from the display panel in the optical film is greater than or equal to 0.2.

18. The display module according to claim 16, wherein the optical film further comprises one or more transparent layers disposed on one side of the second pattern layer away from the first pattern layer;
refractive indices of the two adjacent film layers gradually decrease in the light-emitting direction of the display module in the optical film.

19. The display module according to claim 18, wherein the optical film further comprises a third transparent layer and a fourth transparent layer; the third transparent layer is arranged at one side of a second pattern layer away from the first pattern layer; the fourth transparent layer is arranged at one side of the third transparent layer away from the first pattern layer;

the second pattern layer further comprises a plurality of third protrusions and a plurality of third recesses; the plurality of third protrusions and the plurality of third recesses are arranged near the third transparent layer;

the third transparent layer comprises a plurality of fourth protrusions, a plurality of fourth recesses, a plurality of fifth protrusions, and a plurality of fifth recesses; the plurality of fourth protrusions and the plurality of fourth recesses are arranged near the second pattern layer; the plurality of fifth protrusions and the plurality of fifth recesses are arranged near the fourth transparent layer;

the fourth transparent layer comprises a plurality of sixth protrusions and a plurality of sixth recesses; the plurality of sixth protrusions and the plurality of sixth recesses are arranged near the third transparent layer;

the refractive index of the second pattern layer is greater than a refractive index of the third transparent layer; the refractive index of the third transparent layer is greater than a refractive index of the fourth transparent layer; one of the plurality of third protrusions corresponds to one of the plurality of fourth recesses; one of the plurality of third recesses corresponds to one of the plurality of fourth protrusions; one of the plurality of fifth protrusions corresponds to one of the plurality of sixth recesses; one of the plurality of fifth recesses corresponds to one of the plurality of sixth protrusions.

20. The display module according to claim 1, wherein one or more of the plurality of scatter particles are solid particles, and a refractive index of the scatter particle is different from a refractive index of the corresponding film layer where the scatter particle is disposed.

* * * * *